Feb. 7, 1928.
W. LORUSSO
1,658,490
SLED
Filed Sept. 18, 1925
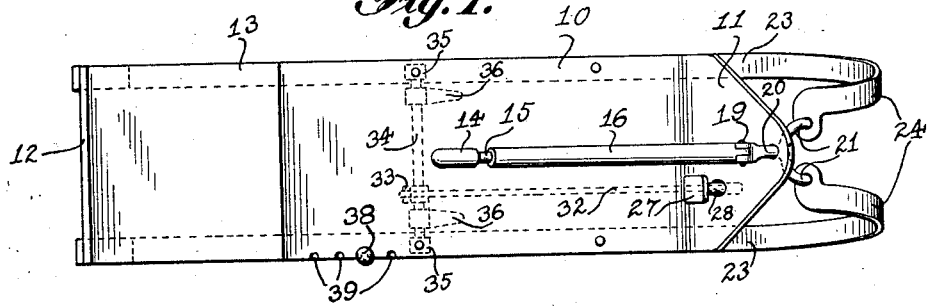
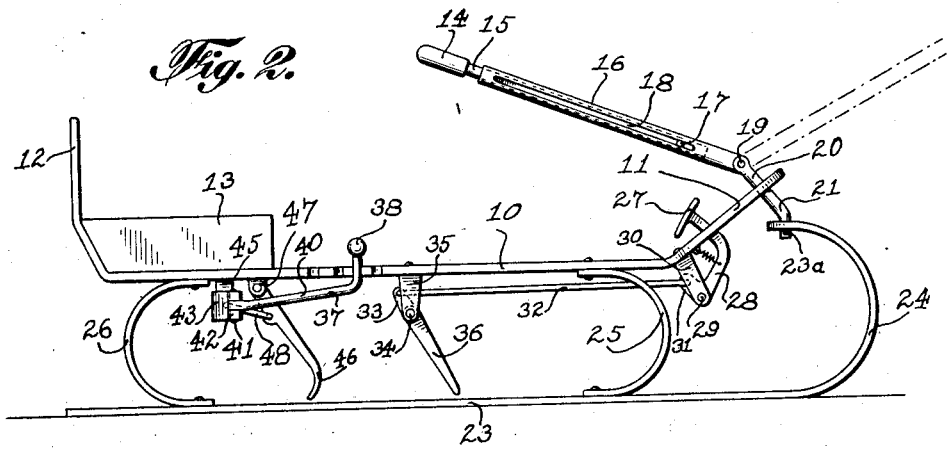
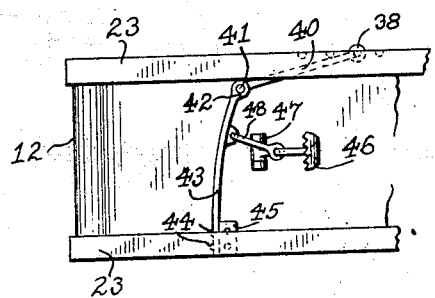
INVENTOR
William Lorusso
BY
H. G. Manning
ATTORNEY Patented Feb. 7, 1928. 1,658,490

UNITED STATES PATENT OFFICE.

WILLIAM LORUSSO, OF WATERBURY, CONNECTICUT.

SLED.

Application filed September 18, 1925. Serial No. 57,103.

This invention relates to sleds, and more particularly to a coasting sled having means under the control of the user for starting, steering, and retarding the motion thereof.

One object of this invention is to provide a coasting sled having hand-released spring-operated starting mechanism.

A further object is to provide a coasting sled of the above nature having an extensible handle which may also be interchangeably used for steering the sled down a hill or for dragging said sled up hill or on the level.

A further object is to provide a sled of the above nature which will be simple in construction, inexpensive to manufacture, easy to manipulate, ornamental in appearance, and very efficient and durable in use.

With these and other objects in view there has been illustrated on the accompanying drawing one form in which the invention may be conveniently embodied in practice.

Fig. 1 represents a top plan view of the sled.

Fig. 2 is a side view of the same.

Fig. 3 is a bottom view of the rear portion of the sled showing the starting mechanism.

Referring now to the drawings in which like reference numerals denote corresponding parts throughout the several views, the numeral 10 indicates a body member having a flat central portion and an inclined tapered foot board 11. The rear of the flat central portion is inclined rearwardly and then extends vertically upward at 12 to form a support for the back of the user, said support 12 being positioned immediately behind a seat 13.

In order to permit the user to steer the sled while in a sitting position, a rearwardly extending steering handle 14 is provided, said handle having a rod member 15 slidably telescoped within a tubular member 16 as clearly shown in Figs. 1 and 2. The rod 15 has a transverse guiding pin 17 near its lower end, said pin passing through said rod and extending outwardly on one side into a slot 18 formed in one side of the tubular member 16, the top of said slot being closed to prevent the handle rod 15 from being pulled out of the tubular member 16. The tubular member 16 is pivoted at its lower end by a pin 19 to a steering fork 20 which projects up through the foot board 11. The lower arms 21 of the steering fork are adapted to pass through the upper in-turned ends 22 of a pair of flexible runners 23 and are connected thereto by any suitable means such as bolts 23ª.

The runners 23 are flat except at their forward portions 24 where they are curved upwardly, rearwardly, and inwardly, as clearly shown in Figs. 1 and 2. In order to connect the runners 23 to the body member 10, a pair of springs 25 and 26 are provided, the spring 25 being convex forwardly, and the spring 26 being convex rearwardly, both of the springs being secured, as by rivets, to said runners 23 and to said body member 10.

In order to permit the user of the sled to retard its motion or to stop it, whenever desired, provision is made of a foot pedal 27 which extends upwardly through the foot board 11 in position to be conveniently engaged by the foot of the operator. The pedal 27 is integrally formed on the end of a bell crank lever 28 pivoted at 29 to a fulcrum member 30, the latter being riveted or otherwise secured underneath the foot board 11. The bell crank lever 28 has a rear arm 31 connected to a rod 32 extending rearwardly underneath the body member, said rod 32 being in turn connected to an arm 33 mounted on a cross rod 34.

The cross rod 34 is adapted to rotate in a pair of depending bearing brackets 35 located under the body member and adjacent the sides thereof. A pair of depending brake levers 36 are rigidly secured to the cross rod 34 and said levers are arranged to come into contact with the snow or ground whenever the foot pedal is operated.

In some cases, as when the sled is at rest on a slight downward incline, it has been found desirable to give the sled an initial push to set it into motion. For this purpose, provision has been made of a starting mechanism having an operating handle 37 adapted to be manipulated by a hand knob 38. The handle 37 may be interchangeably locked in any one of a series of notches 39 in the side of the body member 10. The handle member 38 has a rearwardly extending portion 40 pivoted at its rear end on a pin 41, said pin being housed in the bifurcated free end 42 of a leaf spring 43. The other end of the leaf spring 43 is fastened securely as by rivets 44 to a block 45 supported in any suitable manner under the bottom of the body member. A hook-shaped ground-engaging member 46 is pivoted at its upper end in a bracket 47 underneath the seat and is connected by a link 48 to the intermediate portion of the leaf spring 43.

By means of this construction, in order to set the starting mechanism, the handle 38 will first be moved forward until the leaf spring 43 is under the proper degree of tension, after which the handle will be locked in position by moving it laterally into the adjacent notch 39.

To operate the starting mechanism, it will then merely be necessary for the operator to push the handle laterally out of its notch 39, whereupon the force of the spring 43 will operate to pull the ground-engaging member 46 rearwardly to give the sled a forward push along the ground with sufficient momentum to start the sled going down hill.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new and for which it is desired to secure Letters Patent, is:

1. In a sled, a platform supported on a pair of flexible runners, said runners having their forward ends upwardly and rearwardly bent, steering means comprising a forked member connected to the rearwardly bent parts of both of said runners, and a steering handle connected to said forked member.

2. In a sled, a platform supported on a pair of flexible runners, said runners having their forward ends upwardly and rearwardly bent, steering means comprising a forked member connected to the rearwardly bent parts of both of said runners, a slotted tubular member connected to said forked member, means slidably mounted within said tubular member and adapted to be extended to lengthen said steering means, said slidable means having a guiding member fitting in the slot of said tubular member.

3. In a sled, a platform supported on a pair of flexible runners, said runners having their forward ends curved upwardly and rearwardly and turned inwardly, steering means comprising a forked member connected to the inwardly turned forward parts of both of said runners, and a steering handle pivoted to said forked member.

In testimony whereof, I have affixed my signature to this specification.

WILLIAM LORUSSO.